United States Patent [19]
An

[11] Patent Number: 5,876,092
[45] Date of Patent: Mar. 2, 1999

[54] FOLDAWAY TABLE BEHIND THE BACKREST OF A SEAT

[75] Inventor: Chao-Chyun An, Hsinchu, Taiwan

[73] Assignee: Industrial Technology Research Institute, Hsinchu, Taiwan

[21] Appl. No.: 985,744

[22] Filed: Dec. 5, 1997

[51] Int. Cl.⁶ .................................................. A47B 83/02
[52] U.S. Cl. ........................................... 297/146; 297/163
[58] Field of Search ................................... 297/135, 146, 297/163, 167, 169, 173

[56] References Cited

U.S. PATENT DOCUMENTS

| | | | |
|---|---|---|---|
| 3,009,737 | 11/1961 | Burnett | 297/146 |
| 3,049,374 | 8/1962 | Nance | 297/146 |
| 4,159,071 | 6/1979 | Roca | 247/146 X |
| 4,511,178 | 4/1985 | Brennan | 297/146 |
| 5,092,652 | 3/1992 | Macaluso | 297/146 |
| 5,133,587 | 7/1992 | Hadden | 297/146 |

Primary Examiner—Peter R. Brown
Attorney, Agent, or Firm—W. Wayne Liauh

[57] ABSTRACT

A modular foldaway table is disclosed to be installed behind a backrest of a seat. It includes: (a) a pair of spaced table legs, each table leg having a top bent portion and a bottom bent portion; (b) the top bent portion having a spindle aperture and a curved groove spaced from the spindle aperture; (c) a front board having two lateral sides and a spindle and a pin on each of the two lateral sides, wherein the pin is spaced from the spindle, the spindle is pivotedly screwed to the spindle aperture of the top bent portion of the table leg, the pin is movably engaged with the curved groove for limiting the swinging angle of the front board about the spindle; and a rear board pivotedly engaged with the front board via a pair of spaced hinges. The bottom bent portion has an opening with a slit for snap-installation to the seat and a protrusive ankle spaced from the opening for substantially conforming the bottom bent portion of the table leg against the seat.

6 Claims, 4 Drawing Sheets

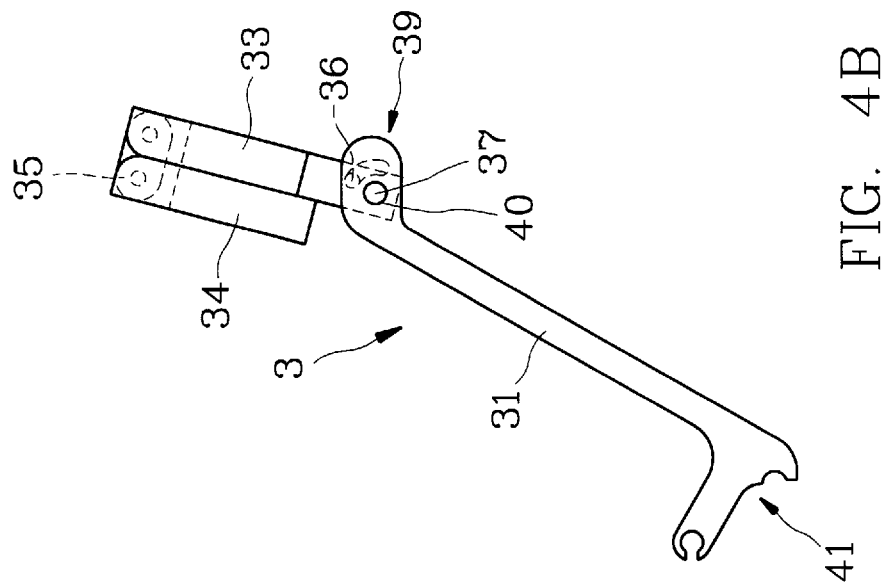
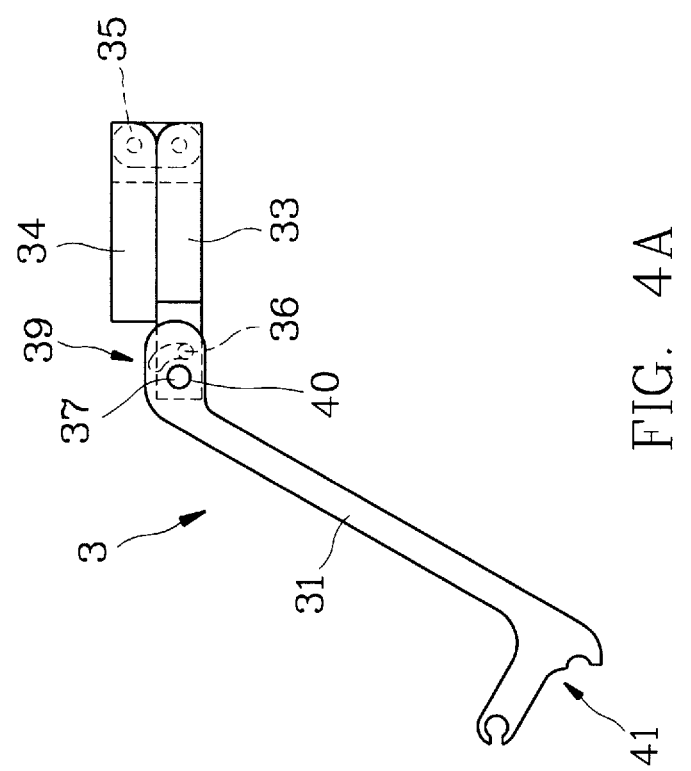
FIG. 4A
FIG. 4B

FOLDAWAY TABLE BEHIND THE BACKREST OF A SEAT

BACKGROUND OF THE INVENTION

1. Field of the Invention

This invention relates to a foldaway table to be disposed behind the backrest of a seat and particularly to a modular foldaway table installed behind the backrest of a passenger seat in a transportation vehicle or the like.

2. Description of the Prior Art

Conventional long-ranged transportation means such as airliners, passenger ships, long-distance coaches and trains usually have a foldaway table installed behind the backrest of the passenger seat or in the armrest for passenger usage. These foldaway tables are provided for holding a meal plate, a notebook computer, or for writing. The type installed behind the backrest of the seat is generally the more popular type. Conventional foldaway tables behind the backrest are usually structured in a simple manner. However, they mostly do not adapt the modular design concept. Therefore, they are relatively difficult to assemble or disassemble. FIG. 1 illustrates one of such structures disclosed in U.S. Pat. No. 4,159,071 (to Hank Roca).

The foldaway table 2 disclosed in the Roca invention includes a pair of table legs 21, a pair of positioning arms 22, a first board 23, a second board 24 and a hinge 25 for connecting the first board 23 to the second board 24. The table leg 21 has one end pivotally engaged with a rear side of the backrest. Another end of the table leg 21 is pivotally engaged with the first board 23. Each positioning arm 22 has one end pivotally engaged with the first board 23 and has a slot at another end thereof engaging with the table leg 21. Therefore the first and second boards (23 & 24) can be flipped open and extended to form a table when in use, or they can be folded and latched behind the backrest when in storage.

Obviously, the structure of the foldaway table disclosed in the Roca invention is quite complicated. It is difficult to assemble or disassemble. The edges of the first and second boards (23 & 24) facing each other have two asymmetrical bow surfaces and, thus, are difficult to be manufactured. As a matter of fact, such difficulty in manufacturing and assembling of Roca's or other conventional foldaway table leads to a higher cost.

Furthermore the transportation means have to provide more diversified facilities to meet a wide variety of today's customer needs. These include video gears, computer support, entertainment equipment, etc. While undergoing the changing of these facilities, it usually needs to disassemble the foldaway table from the seat and then reassemble it again after the change is completed. Apparently, for the conventional foldaway tables, it is both difficult and time-consuming for carrying out any small structural modification.

SUMMARY OF THE INVENTION

In view of aforesaid disadvantages, it is therefore an object of this invention to provide a foldaway table behind the backrest of a seat which is modularly designed and thus is easy to assemble and disassemble while facilitating the installation and the making of changes.

It is another object of this invention to provide a foldaway table which is easy to engage or disengage with the seat.

It is a further object of this invention to provide a foldaway table which is simply designed and allows installation or disassembly to be done in a short time with simple hand tools.

It is yet another object of this invention to provide a foldaway table which has a simple structure for reducing processing time and cost.

The foldaway table according to this invention includes a pair of spaced table legs pivotedly holding, at one end, a front board between them. Each table leg has a curved groove engageable with a pin on a lateral side of the front board so that the front board may be swung open for use, or may be swung closed and latched behind the backrest of the seat when in storage. The front board may be screwed to the table leg at the pivot axis. Therefore, it is easy to assemble or disassemble whenever needed. The table leg pivotedly engages, at another end, with the seat via an opening which has a slit. Hence, the installation may be done by snapping insertion without using any hand tool. A rear board may be provided and is foldable over the front board via a pair of hinges. The connecting edges of the front board and rear board may be made symmetrically so that they can be produced much easily and at lower cost.

BRIEF DESCRIPTION OF THE DRAWINGS

The invention, as well as its many advantages, may be further understood by the following detailed description and drawings in which:

FIG. 4A is a side view of the preferred embodiment according to this invention at an extending position. FIG. 4B is a side view of the preferred embodiment according to this invention at a folding position.

DETAILED DESCRIPTION OF THE PREFERRED EMBODIMENT

Figure 1:
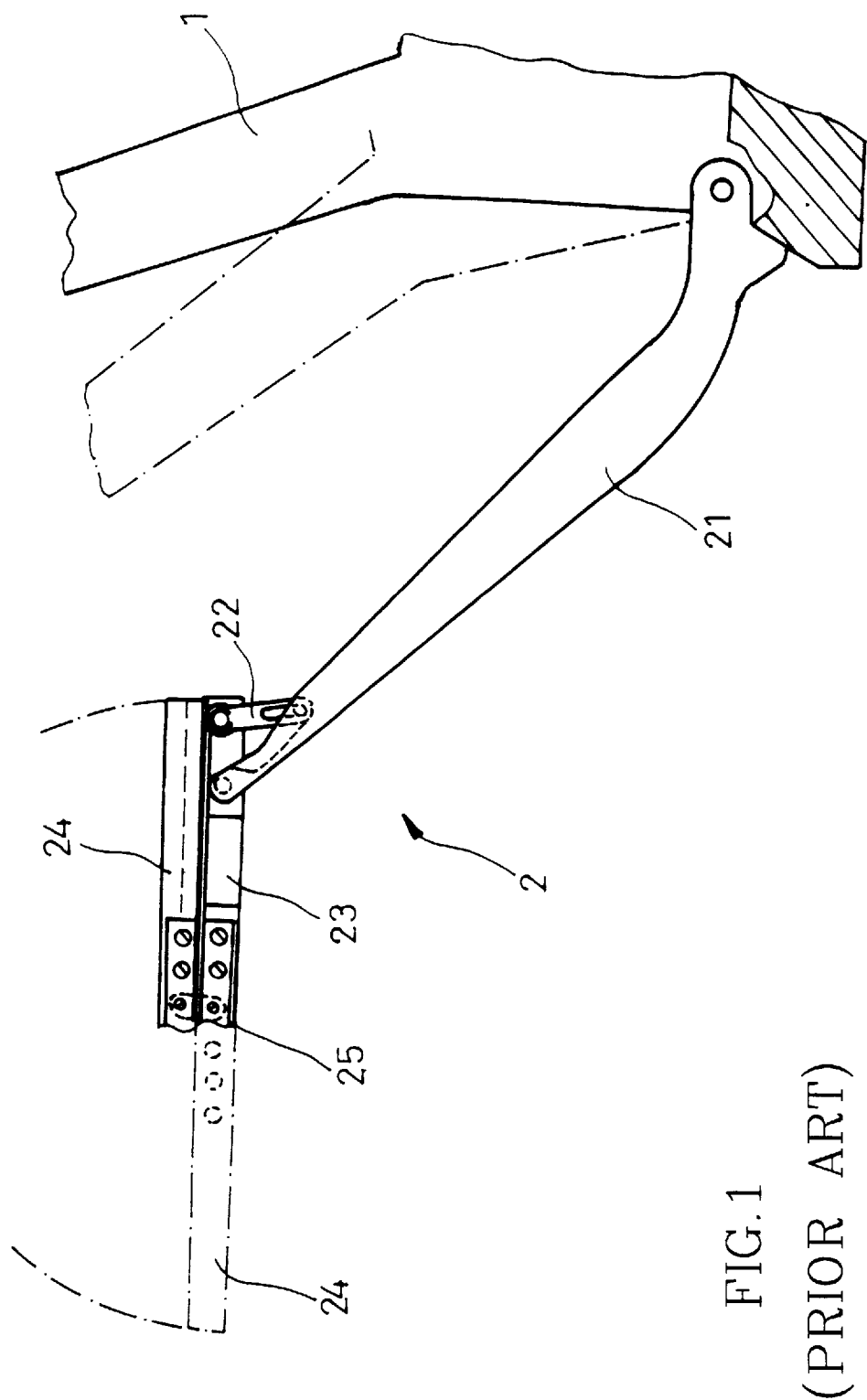
FIG. 1 is a side view of a conventional foldaway table behind the backrest of a seat.
Figure 2:
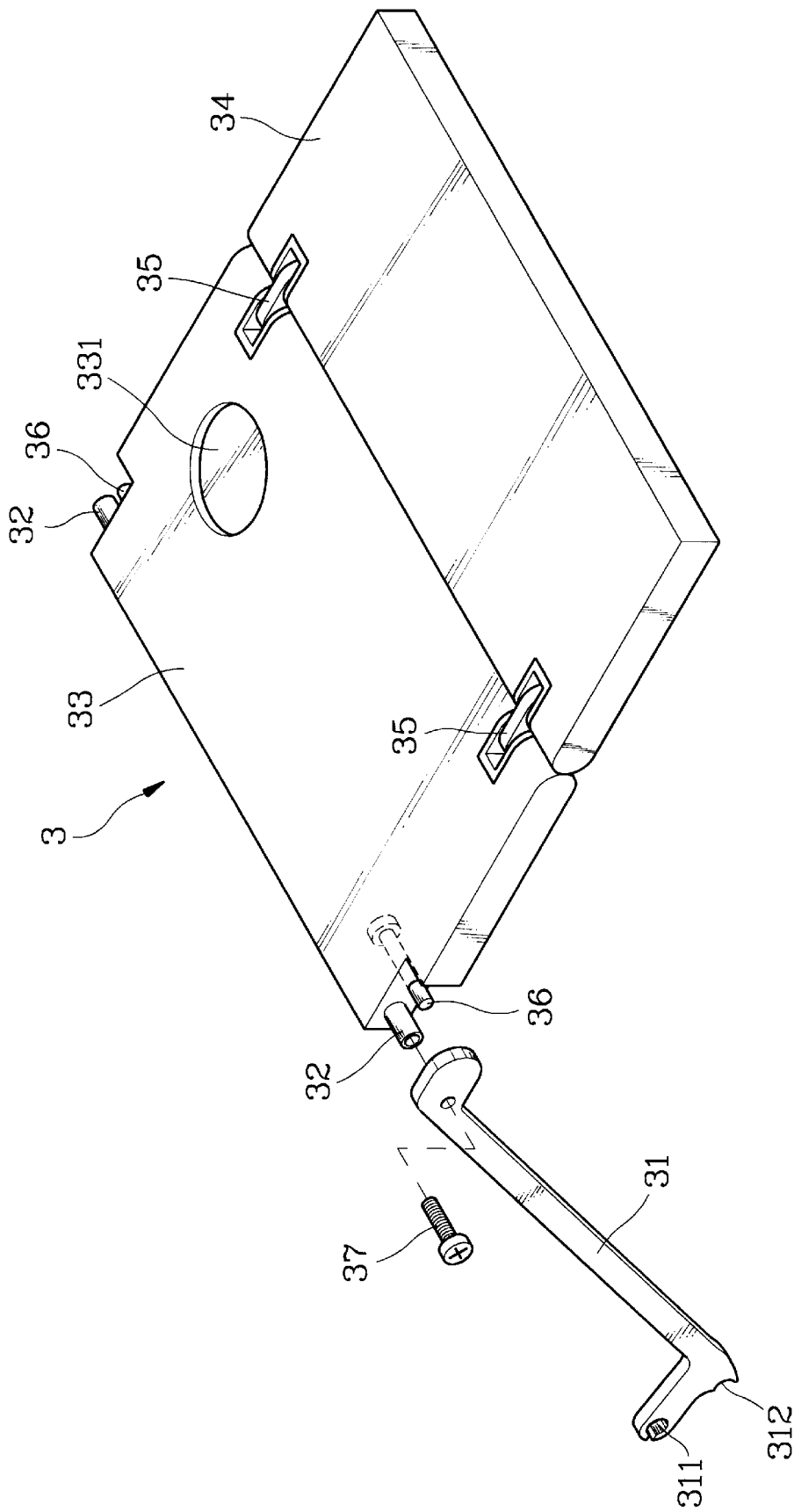
FIG. 2 is a perspective view of the preferred embodiment according to this invention.
Figure 3:
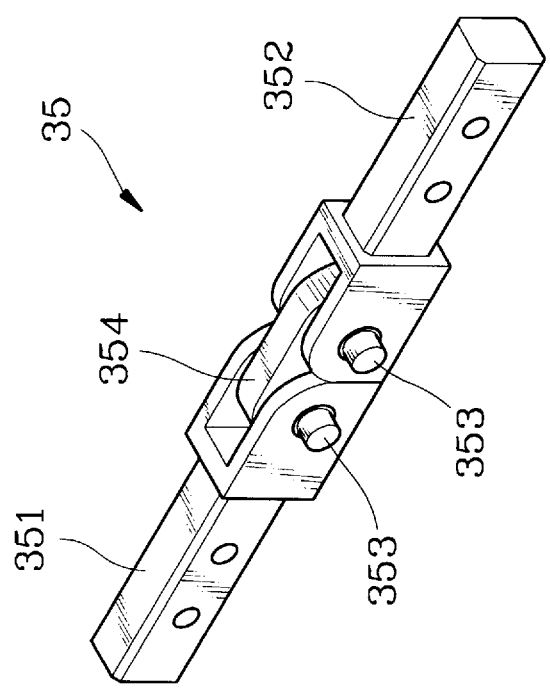
FIG. 3 is a perspective view of a hinge of the preferred embodiment according to for this invention.

Referring to FIG. 2, the foldaway table 3 according to this invention includes a pair of spaced table legs 31, a front board 33 pivotedly engages with the table legs 31 at one end via two spindles 32 at two lateral sides thereof, and a rear board 34 engaging with the front board 33 through a pair of hinges 35.

At one end of the table leg 31, there is an arch-shaped groove 39 provided on the surface of a top bent portion 39 of the table leg 31. The arch-shaped groove 39 is engageable with a pin 36 on a lateral side of the front board 33 (also referring to FIGS. 4A and 4B). The spindle 32 is screwed to the table leg via a screw bolt 37 which screws through a spindle aperture 40 formed in the top bent portion 39. Therefore the front board 33 may be swung clockwise about the spindle 32 until the pin 36 hitting the bottom end of the groove 36. It becomes an open and extended position (FIG. 4A) for use. When the front board 33 is swung counter-clockwise until the pin 36 hitting the top end of the groove 36, it becomes a closed and folding position (FIG. 4B). The screw bolt 37 enables the front board 33 be assembled to or disassembled from the table leg 31 easily.

At the bottom bent portion 41 of the table leg 31, there is an opening 311 which has a slit. Therefore the table leg 31 may be snapped into a seat easily for installation. It is also easy to disassemble the table leg 31 from the seat. There is a protrusive ankle 312 spaced from the opening 311 for anchoring to the seat to support the table leg 31 at extending position (FIG. 4A).

The front board 33 may have a cup hole 331 for holding a cup therein. The cup hole 331 may be circular, rectangular or another other shape desired.

The front board 33 and the rear board 34 are pivotedly engaged together by a pair of hinges 35. Each hinge 35 has a front arm 351 for engaging with the front board 33, a rear arm 352 for engaging with the rear board 34, a linking block 354 and a pair of hinge spindles 353. The height of the linking block 354 should be no greater than the thickness of the front and rear boards to make the table surface flat and smooth when in use. The edges of the front board 33 and rear board 34 facing each other may be made symmetrically (such as curve, flat or other shape desired) so that the production process can be simple and less costly. When there is space constraint in the backrest of the seat, the rear board 34 may be omitted and dispensed with.

It may thus be seen that the objects of the present invention set forth herein, as well as those made apparent from the foregoing description, are efficiently attained. While the preferred embodiment of the invention has been set forth for purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. A modular foldaway table to be installed behind a backrest of a seat of a transportation means, comprising:
    a pair of spaced table legs, each table leg having a main portion, a top bent portion angled relative to said main portion, and a bottom bent portion which is approximately perpendicular to said main portion;
    said bottom bent portion having an end with an opening with a slit for snap-installation to the seat and a protrusive ankle spaced from said opening for substantially conforming said bottom bent portion of said table leg against said seat;
    said top bent portion having a spindle aperture and a curved groove spaced from the spindle aperture;
    a front board having two lateral sides and a spindle and a pin on each of said two lateral sides, wherein said pin is spaced from said spindle, said spindle is pivotedly screwed to said spindle aperture of said top bent portion of said table leg, said pin is movably engaged with said curved groove for limiting the swinging angle of said front board about said spindle; and
    a rear board pivotedly engaged with the front board via a pair of spaced hinges.

2. A modular foldaway table of claim 1, wherein said front board has a cup opening therein.

3. A modular foldaway table of claim 1, wherein said spindle is pivotedly engaged to said spindle aperture by means of a screw bolt.

4. A modular foldaway table to be installed behind a backrest of a seat in a transportation means, comprising:
    a pair of spaced table legs, each said table leg having a main portion, a top bent portion which is angle relative to said main portion, and a bottom bent portion which is approximately perpendicular to said main portion, wherein said bottom bent portion having an end with an opening with a slit for snap-installation to the seat and a protrusive ankle spaced from the opening for substantially conforming said bottom bent portion of said table leg to the seat, and said top bent portion having a spindle aperture and a curved groove spaced from the spindle aperture; and
    a front board having two lateral sides and a spindle and a pin on each of said lateral sides, wherein said pin is spaced from the spindle, said spindle is pivotly screwed to said spindle aperture of said front bent portion of said table leg, said pin is moveably engaged with said curved groove for limiting the swinging angle of the front board about the spindle;
    further said spindle aperture and said curved groove in said front bent portion are separated by such a distance so as to provide an adequate support for said foldaway table to carry a significant amount of weight thereon.

5. A modular foldaway table of claim 4, wherein said front board has a cup opening therein.

6. A modular foldaway table of claim 4, wherein said spindle is pivotedly engaged to said spindle aperture by means of a screw bolt.

* * * * *